United States Patent [19]
Yamauchi et al.

[11] Patent Number: 5,784,118
[45] Date of Patent: Jul. 21, 1998

[54] VIDEO SIGNAL PHASE SYNCHRONIZING METHOD, CIRCUIT AND SYNTHESIZING APPARATUS

[75] Inventors: Etsuro Yamauchi, Tokyo; Yasuhide Mogi, Kanagawa; Tokuya Fukuda, Tokyo, all of Japan

[73] Assignee: Sony Corporation, Tokyo, Japan

[21] Appl. No.: 750,902

[22] PCT Filed: Apr. 19, 1996

[86] PCT No.: PCT/JP96/01071

§ 371 Date: Dec. 19, 1996

§ 102(e) Date: Dec. 19, 1996

[87] PCT Pub. No.: WO96/33577

PCT Pub. Date: Oct. 24, 1996

[30] Foreign Application Priority Data

Apr. 21, 1995 [JP] Japan ................... 7-096731

[51] Int. Cl.$^6$ .................................................. H04N 9/45
[52] U.S. Cl. .................................. 348/505; 348/584
[58] Field of Search .................................. 348/505, 506, 348/584, 588, 598, 578, 585, 586, 589, 659, 572, 573, 574, 660, 497, 498, 549; 358/22, 183; H04N 5/262, 5/272, 5/265, 9/74, 9/45

[56] References Cited

U.S. PATENT DOCUMENTS 5,541,666   7/1996   Zeidler et al. .................. 348/584

FOREIGN PATENT DOCUMENTS 64-89692   4/1989   Japan.

*Primary Examiner*—Chris Grant
*Attorney, Agent, or Firm*—Frommer Lawrence & Haug LLP; William S. Frommer

[57] ABSTRACT

When a continuous wave signal synchronized with a first color subcarrier signal is generated by a color subcarrier extracting circuit, a phase error detecting circuit, an A/D converting circuit, and a digital oscillating circuit from an analog video signal containing a first color sub carrier signal supplied to a first input terminal and a digital video signal containing a color signal component supplied to a second input terminal is converted by a digital video signal converting circuit into a composite video signal containing a carrier chrominance signal, a color signal component is converted into a carrier chrominance signal by using the continuous wave signal and a phase of a first color subcarrier signal contained in the analog video signal and a phase of a second color subcarrier signal of a composite video signal formed from the digital video signal are synchronized with each other. According to this arrangement, a phase of the carrier chrominance signal of the analog video signal and a phase of a carrier chrominance signal contained in the composite video signal formed from the digital video signal can be synchronized with each other by the simple arrangement, for example, and hence an image expressed by the digital video signal and an image expressed by the analog video signal can be easily synthesized with each other.

6 Claims, 4 Drawing Sheets

VIDEO SIGNAL PHASE SYNCHRONIZING METHOD, CIRCUIT AND SYNTHESIZING APPARATUS

TECHNICAL FIELD

The present invention relates to video signal phase synchronizing method, circuit and synthesizing apparatus for use in synthesizing video signals, for example, and particularly to video signal synchronizing method, circuit and synthesizing apparatus for use in synthesizing an image expressed by a digital video signal and an image expressed by an analog video signal.

BACKGROUND ART

As image compression and expansion technique is improved, communication network is digitized, computers are widespread and digital satellite broadcasting and digital CATV become commercially available, recently, there is an increasing possibility that a digitized video signal (television signal) can be used.

On the other hand, social base of conventional analog video signal is arranged as video devices such as existing television broadcasting network, home television receivers, VTRs are widespread, and hence it is not considered at present that such analog video signal becomes useless. Accordingly, at present, a video signal is generally used in the condition that the analog video signal and the digitized video signal are existing in the mixed state and used simultaneously.

Therefore, when a plurality of video signals are used simultaneously, there is examined a method of displaying a video signal in the synthesized state, such as displaying a plurality of video signals on a single display screen. As a method of synthesizing an analog video signal, for example, there are known techniques disclosed in Japanese laid-open patent publication No. 64-11477 and Japanese laid-open patent publication No. 1-190176.

Specifically, in Japanese laid-open patent publication No. 64-11477, a first video signal is converted into digital data and stored in three memory means sequentially. Then, these memory means are read out in synchronism with a second video signal, whereby the first video signal stored in these memory means is synchronized with the second video signal and the first and second video signals can be synthesized.

However, according to the above arrangement, although the first and second video signals are synchronized with each other in the level of synchronizing signal, a phase synchronization of a color subcarrier signal with a higher frequency is not considered at all. Therefore, according to this arrangement, color signals cannot be synthesized. Hence, color signals can be synthesized only when the first video signal, for example, is a luminance signal (black and white signal).

On the other hand, in Japanese laid-open patent publication No. 1-190176, RGB signals are respectively decoded from first and second composite video signals and stored in the first and second frame memories in accordance with synchronizing signals. Then, these frame memories are read out in synchronism with any one of video signals and the first and second video signals thus read out are synthesized in the state of RGB signals and a composite video signal is again encoded from the synthesized RGB signal.

According to this arrangement, since the first and second video signals are synthesized in the form of RGB signals, a problem of synchronization of carrier chrominance signal does not occur. However, in this arrangement, three systems of RGB should be required in the circuits from the A/D converters 61c, 62c to the D/A converter 72, resulting in a circuit arrangement become extremely large in scale. On the other hand, when a plurality of video signals are synthesized in the form of a composite video signal, not only the synchronizing signal of the synthesized composite video signal but also a phase of carrier chrominance signal should be synchronized.

In view of the aforesaid aspect, it is an object of this application to provide video signal synchronizing method, circuit and synthesizing apparatus in which an image expressed by a digital video signal and an image expressed by an analog video signal can be synthesized with each other by a simple arrangement.

DISCLOSURE OF INVENTION

According to the present invention, when a continuous wave signal synchronized with a first color subcarrier signal is generated from an analog video signal containing the first color subcarrier signal and a digital video signal containing a color signal component is converted into a composite video signal containing a carrier chrominance signal, the color signal component is converted into the carrier chrominance signal by using the continuous wave signal and a phase of the first color subcarrier signal and that of the carrier chrominance signal are synchronized with each other. In association therewith, there are disclosed video signal phase synchronizing method, circuit and synthesizing apparatus.

BEST MODE FOR CARRYING OUT THE INVENTION

Video signal synchronizing method, circuit and synthesizing apparatus according to the present invention will hereinafter be described in detail with reference to the drawings.

The present invention is to provide video signal synchronizing method, circuit and synthesizing apparatus in which an image expressed by a digital video signal and an image expressed by an analog video signal can be synthesized by a simple arrangement. To this end, according to the present invention, a continuous wave signal synchronized with a color subcarrier signal of an analog video signal is generated and a color signal component of a digital video signal is converted into a carrier chrominance signal by using the continuous wave signal, thereby forming a composite video signal containing a carrier chrominance signal synchronized with a phase of a color subcarrier signal of the analog video signal.

Figure 1:
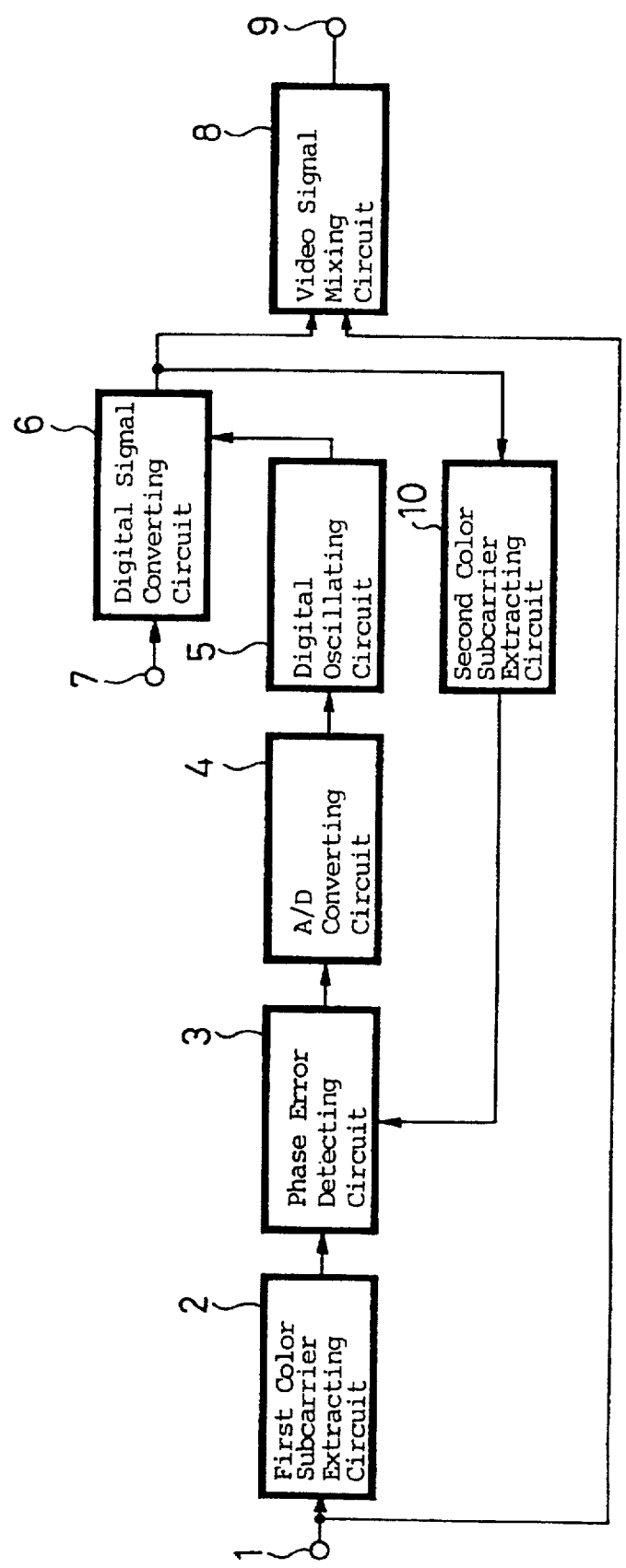
FIG. 1 is a block diagram showing a video signal synthesizing apparatus according to a first embodiment of the present invention.

According to a first embodiment of the present invention, there is considered the following arrangement. FIG. 1 is a block diagram showing a video signal synthesizing apparatus including a circuit for realizing a video signal synchronizing method according to a first embodiment of the present invention.

In FIG. 1, an analog video signal (composite video signal) is supplied to an input terminal 1. The analog video signal from the input terminal 1 is supplied to a first color subcarrier extracting circuit 2. The color subcarrier extracting circuit 2 is a burst gate circuit which gates an analog video signal supplied thereto at a predetermined timing to output a color burst signal (color subcarrier signal).

A first color subcarrier signal extracted by this first color subcarrier extracting circuit 2 is supplied to a phase error detecting circuit 3. The phase error detecting circuit 3 is supplied with a second color subcarrier signal in a composite video signal formed from a digital video signal which will be described later on. The phase error detecting circuit 3 detects magnitude and direction (delayed phase-advanced phase) of phase difference between the first and second color subcarrier signals.

Specifically, the phase error detecting circuit 3 is a phase detecting circuit, for example, and detects magnitude and direction (delayed phase-advanced phase) of phase difference between the first and second color subcarrier signals supplied to the phase detecting circuit.

It is assumed that the synchronizing signals of the analog video signal from which the first and second color subcarrier signals are generated and the composite video signal formed from the digital video signal are substantially phase-matched previously.

A phase difference detection signal detected by the phase difference detecting circuit 3 is supplied to an A/D converting circuit 4, in which an analog value indicative of magnitude and direction of the phase difference of the detection signal is converted into a digital value. The value indicative of magnitude and direction of the phase difference thus converted into the digital value is supplied to a digital oscillating circuit 5 of a numerical value control type which forms a continuous wave signal phase-synchronized with the color subcarrier signal in the form of digital value.

The digital oscillating circuit 5 of numerical value control type generates a sine wave signal with necessary frequency and phase in the form of digital values which change sequentially and repeatedly in response to a digital value of magnitude and direction of inputted phase difference.

Therefore, the oscillating circuit 5 outputs a continuous wave signal (color subcarrier signal) phase-synchronized with the first color subcarrier signal extracted from the analog video signal by the first color subcarrier extracting circuit 2 in the form of digital data. Incidentally, a continuous wave signal of a digital sine wave signal and a digital cosine wave signal phase-synchronized with the above-mentioned first color subcarrier signal.

The continuous wave signal of the digital sine wave signal and the digital cosine wave signal formed by the oscillating circuit 5 is supplied to a digital video signal converting circuit 6. The digital video signal converting circuit 6 converts a digital video signal supplied to a terminal 7, for example, to an analog composite video signal by using these digital sine wave signal and digital cosine wave signal.

Details of conversion in the digital video signal converting circuit 6 will be described later on.

The analog composite video signal converted by the digital video signal converting circuit 6 is supplied to a mixing circuit 8, in which it is mixed or superimposed upon the analog video signal from the input terminal 1. The thus mixed or superimposed analog video signal is developed at an output terminal 9.

Concurrently therewith, the analog composite video signal from the digital video signal converting circuit 6 is supplied to the second color subcarrier extracting circuit 10, and a second color subcarrier signal thus extracted is supplied to the above-mentioned phase error detecting circuit 3 with the result that, when a phase difference is produced between the analog video signal from the input terminal 1 and the analog composite video signal thus converted by the digital video signal converting circuit 6, a feedback control is carried out so as to cancel such phase difference out.

In this manner, there is formed the analog composite video signal containing the second carrier signal synchronized with the phase of the first carrier chrominance signal of the analog video signal inputted to the input terminal 1. Since these analog video signal and analog composite video signal are phase-synchronized with each other, these signals can be synthesized directly.

Figure 2:
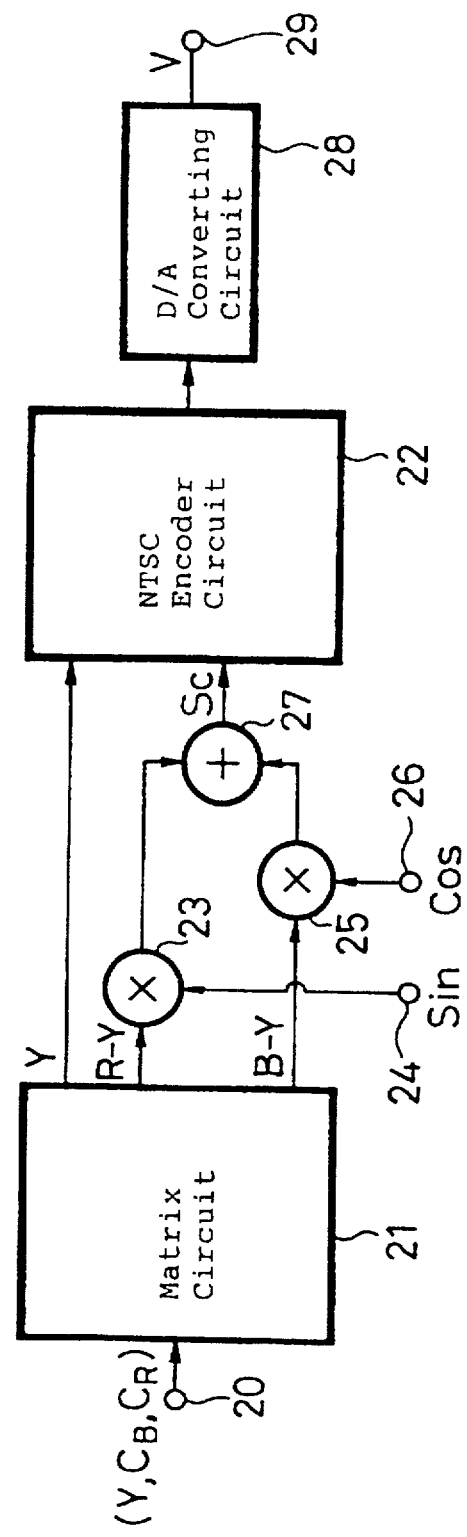
FIG. 2 is a block diagram showing an example of a digital video signal converting circuit.

Further, in the above-mentioned apparatus, the digital video signal converting circuit 6 for converting the digital video signal into the composite video signal by using the digital sine wave signal Sin and the digital cosine wave signal Cos is arranged as follows. FIG. 2 shows a specific circuit arrangement of the digital video signal converting circuit.

In FIG. 2, a luminance signal Y and two-axis color signals $C_B$, $C_R$ of the digital video signal supplied to an input terminal 20, for example, are supplied to a digital matrix circuit 21. Further, this matrix circuit 21 outputs a digital luminance signal Y and color difference signals R-Y and B-Y from the above-mentioned digital video signal. Then, the thus outputted digital luminance signal Y is supplied to a digital NTSC encoder 22.

On the other hand, the digital color difference signal R-Y from the matrix circuit 21 is supplied to a multiplying circuit 23, in which it is multiplied with the above digital sine wave signal Sin supplied to a terminal 24. The digital color difference signal B-Y from the matrix circuit 21 is supplied to the multiplying circuit 25, in which it is multiplied with the above digital cosine wave signal Cos supplied to a terminal 26. An adding circuit 27 adds these multiplied signals to provide a digital carrier chrominance signal Sc.

Further, this digital carrier chrominance signal Sc is supplied to the digital NTSC encoder circuit 22. The NTSC encoder circuit 22 synthesizes the digital carrier chrominance signal and the above digital luminance signal Y to provide an NTSC digital composite video signal. Further, this digital composite video signal is supplied to a D/A converting circuit 28, in which it is converted into an analog composite video signal V and developed at an output terminal 29.

Accordingly, in this circuit, the digital video signal supplied to the input terminal 20 is encoded (converted) by using the digital sine wave signal Sin and the digital cosine wave signal Cos supplied to the terminals 24, 26. Then, the thus encoded digital composite video signal is D/A-converted, whereby the digital video signal supplied to the input terminal 20 is converted into the NTSC analog composite video signal and outputted to the output terminal 29.

Therefore, in FIG. 1, the digital sine wave signal Sin and the digital cosine wave signal Cos formed by the oscillating circuit 5 are supplied to the above terminals 24, 26, whereby a color signal component in the digital video signal supplied to the input terminal 7 of FIG. 1, for example, is phase-synchronized with the color subcarrier signal of the analog video signal supplied to the input terminal 1 and thereby encoded (converted).

Then, in this case, since these analog signals and the digital video signals that are phase-synchronized with these analog video signals and encoded are phase-synchronized in the level of the carrier chrominance signal, if these video signals are synthesized or superimposed by the mixing circuit 8, then an image expressed by these digital video signals and an image expressed by the analog video signal can be synthesized or superimposed directly.

Specifically, in the above-mentioned apparatus, the image expressed by the digital video signal supplied to the input terminal 7 and the image expressed by the analog video signal supplied to the input terminal 1 are synthesized or superimposed directly, whereby the video signal in which these images are synthesized or superimposed can be outputted to the output terminal 9.

Further, in the above-mentioned apparatus, the second color subcarrier extracting circuit 10 extracts the second color subcarrier signal from the analog composite video signal from the digital video signal converting circuit 6 and this second color subcarrier signal is supplied to the above-mentioned phase error detecting circuit 3, whereby the feedback control is carried out so as to cancel the phase difference out when the phase difference occurs between the analog video signal from the input terminal 1 and the analog composite video signal converted by the digital video signal converting circuit 6.

As described above, according to the above-mentioned apparatus, the continuous wave signal synchronized with the color subcarrier signal of the analog video signal is generated and the color signal component of the digital video signal is converted into the carrier chrominance signal by using this continuous wave signal, thereby forming the composite video signal containing the carrier chrominance signal synchronized with the phase of the color subcarrier signal of the analog video signal. Therefore, the above-mentioned apparatus can synthesize the image expressed by the digital video signal and the image expressed by the analog video signal by the simple arrangement.

Figure 3:
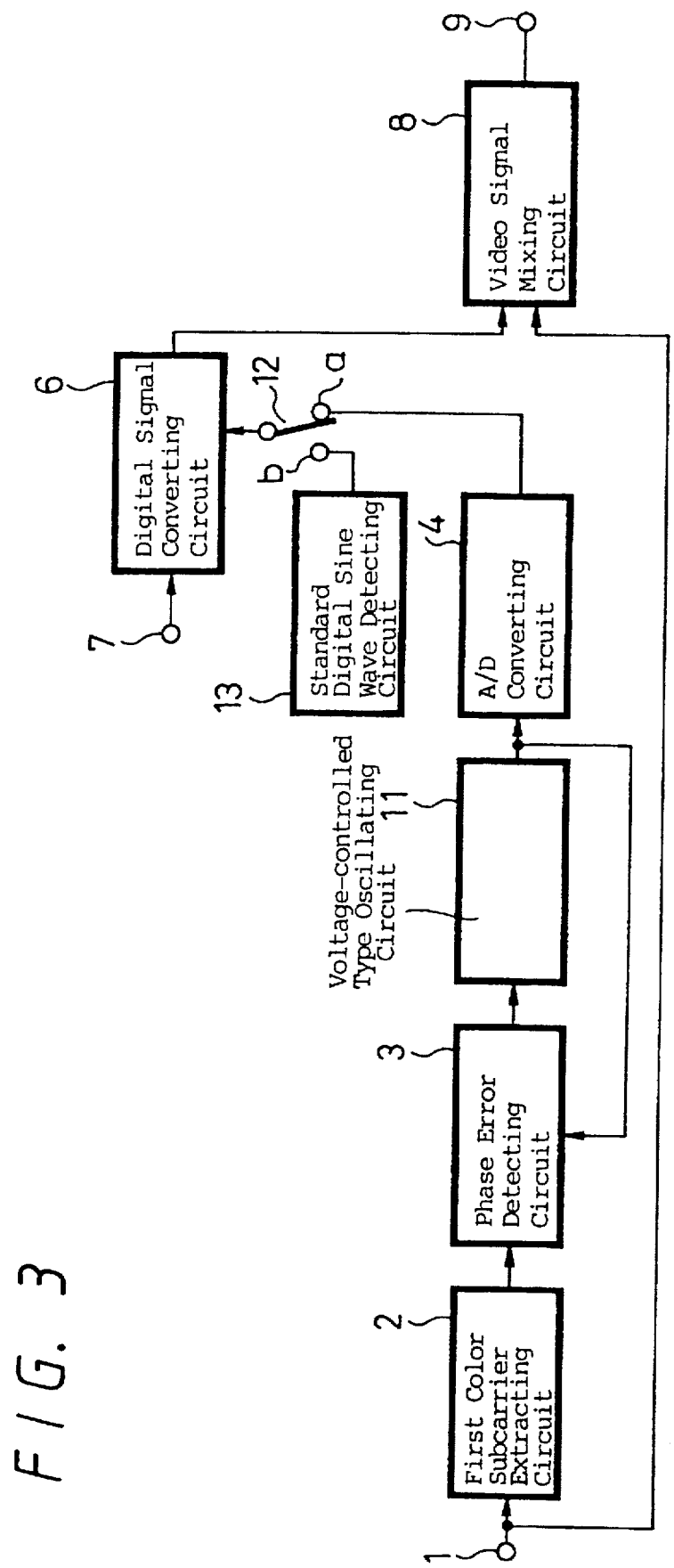
FIG. 3 is a block diagram showing a video signal synthesizing apparatus according to a second embodiment of the present invention.

FIG. 3 is a block diagram showing a video signal synthesizing apparatus including a circuit which realizes the video signal phase synchronizing method according to the present invention according to a second embodiment. In FIG. 3, parts corresponding to those of FIG. 1 are marked with the same references and therefore need not be described in detail.

Specifically, in FIG. 3, in the apparatus according to the second embodiment, the analog video signal from the input terminal 1 is supplied to the first color subcarrier extracting circuit 2 similarly to the apparatus according to the first embodiment. Further, the first color subcarrier signal extracted by the first color subcarrier extracting circuit 2 is supplied to the phase error detecting circuit 3.

Then, in the apparatus according to the second embodiment, an output from the phase error detecting circuit 3 is supplied to the voltage-controlled type oscillating circuit 11. Further, the phase of the oscillation signal from the oscillating circuit 11 is controlled by the output from the phase error detecting circuit 3. Then, the output from this oscillating circuit 11 is fed back to the phase error detecting circuit 3.

Thus, the phase error detecting circuit 3 and the voltage-controlled type oscillating circuit 11 constitute a phase-locked loop (PLL). Then, this oscillating circuit 11 outputs a continuous wave signal of a sine wave signal, for example, phase-synchronized with the first color subcarrier signal.

Further, this continuous wave signal is supplied to an A/D converting circuit 4, in which an analog value indicative of a waveform of the continuous wave signal is converted into a digital value. Accordingly, this A/D converting circuit 4 outputs a digital sine wave signal which results from digitally converting the sine wave signal phase-synchronized with the above-mentioned first color subcarrier signal.

Accordingly, in the apparatus according to the second embodiment, the A/D converting circuit 4 outputs the digital sine wave signal phase-synchronized with the first color subcarrier signal of the analog video signal supplied to the input terminal 1. Then, this digital sine wave signal is supplied through a contact "a" of a switching circuit 12 to the digital video signal converting circuit 6.

When the analog video signal is not supplied to the input terminal 1, the switching circuit 12 is connected to a contact "b", whereby a digital sine wave signal from a standard digital sine wave generating circuit 13, for example, is supplied through the contact "b", of the switching circuit 12 to the digital video signal converting circuit 6.

Further, the analog composite video signal converted by this digital video signal converting circuit 6 is supplied to the mixing circuit 8, in which it is synthesized with or superimposed upon the analog video signal from the above input terminal 1. Thus, the synthesized or superimposed analog video signal is outputted to the output terminal 9.

In the apparatus according to the second embodiment, when the analog video signal is supplied to the input terminal 1 and the switching circuit 12 is connected to the contact "a", the digital sine wave signal from the A/D converting circuit 4 is supplied to the digital video signal converting circuit 6. Accordingly, similarly to the apparatus according to the first embodiment, the digital video signal supplied to the terminal 7, for example, is converted into an analog composite video signal by using the digital sine wave signal.

Specifically, also in the apparatus according to the second embodiment, the color signal component in the digital video signal supplied to the input terminal 1 is phase-synchronized with the color subcarrier signal of the analog video signal supplied to the input terminal 1 and encoded (converted).

Further, since these analog video signals and the digital video signal phase-synchronized with the analog video signal and encoded are phase-synchronized in the level of the carrier chrominance signal, if these video signals are synthesized with or superimposed upon each other by the mixing circuit 8, then an image expressed by these digital video signals and an image expressed by the analog video signals can be synthesized or superimposed directly.

Thus, the image expressed by the digital video signal supplied to the input terminal 7 and the image expressed by the analog video signal supplied to the input terminal 1 are synthesized or superimposed directly, whereby the video signal in which these images are synthesized or superimposed can be outputted to the output terminal 9.

Moreover, in the apparatus according to the second embodiment, when the analog video signal is not supplied to the input terminal 1, the switching circuit 12 is connected to the contact "b", whereby the digital sine wave signal from the standard digital sine wave generating circuit 13 is supplied to the digital video signal converting circuit 6. Then, the digital video signal supplied to the terminal 7, for example, is converted into the analog composite video signal by using this standard sine wave signal.

Figure 4:
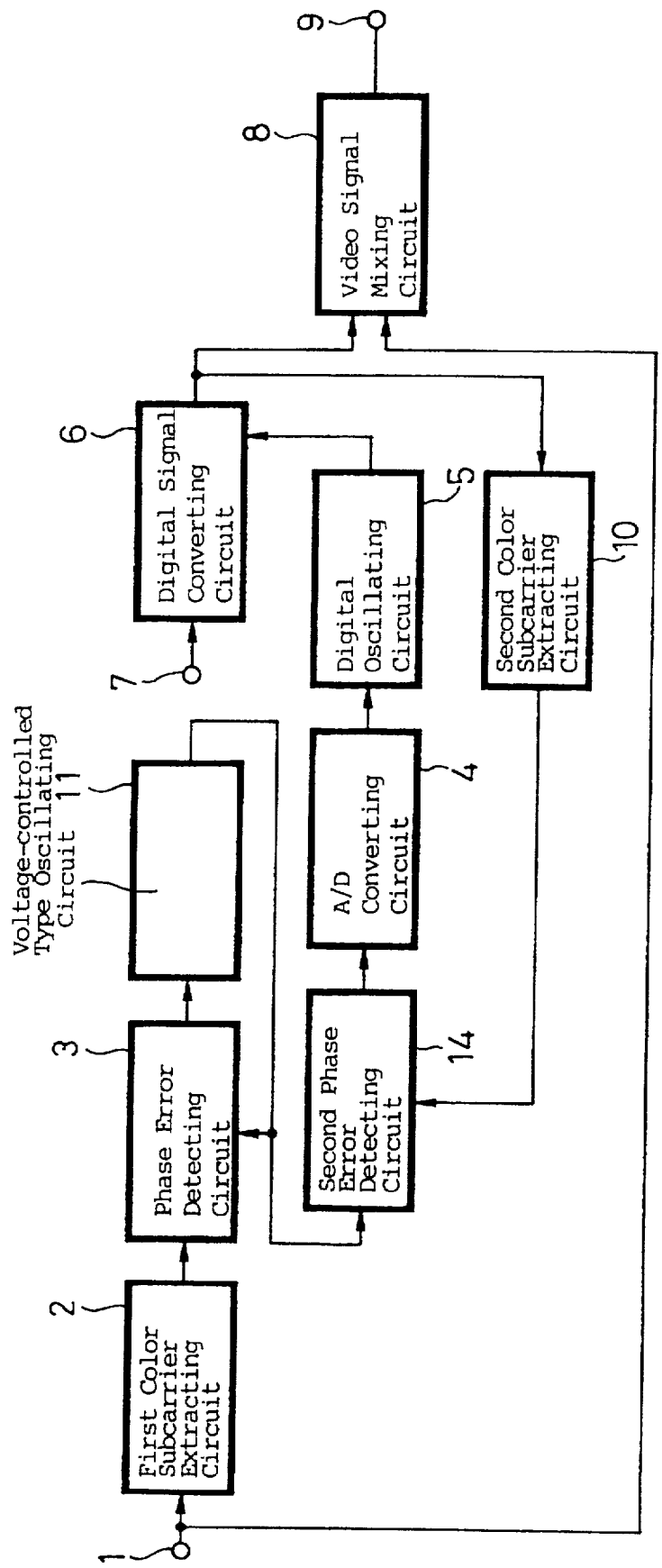
FIG. 4 is a block diagram showing a video signal synthesizing apparatus according to a third embodiment of the present invention.

FIG. 4 is a block diagram showing a video signal synthesizing apparatus including a circuit which realizes the video signal synchronizing method according to a third embodiment of the present invention. In FIG. 4, like parts corresponding to those of FIGS. 1 and 3 are marked with the same references and therefore need not be described.

Specifically, in FIG. 4, in the apparatus according to the third embodiment, similarly to the apparatus according to the second embodiment, the analog video signal from the input terminal 1 is supplied to the first color subcarrier extracting circuit 2, and the extracted first color subcarrier signal is supplied to the phase error detecting circuit 3. Further, the output from the phase error detecting circuit 3 is supplied to the voltage-controlled type oscillating circuit 11 and the phase of the oscillation signal from the oscillating circuit 11 is controlled by the output from the phase error detecting circuit 3.

Moreover, the output from the oscillating circuit 11 is fed back to the phase error detecting circuit 3, whereby the phase error detecting circuit 3 and the voltage-controlled type oscillating circuit 11 constitute the phase-lock loop (PLL). Thus, the oscillating circuit 11 outputs the continuous wave signal of the sine wave signal phase-synchronized with the above first color subcarrier signal.

Then, in the apparatus according to the third embodiment, the continuous wave signal of the sine wave signal from the oscillating circuit 11 is supplied to the second phase error detecting circuit 14. Further, the second color subcarrier signal in the composite video signal formed from a digital video signal, which will be described later on, is supplied to the phase error detecting circuit 14.

Accordingly, the phase error detecting circuit 14 detects magnitude and direction (delayed phase·advanced phase) of phase difference between the first and second color subcarrier signals. Then, the phase difference detection signal detected by the phase error detecting circuit 14 is supplied to the A/D converting circuit 4 and thereby the values of magnitude and direction of the phase difference thus converted in the form of digital values are supplied to the numerical value control-type digital oscillating circuit 5.

As a consequence, this oscillating circuit 5 outputs the continuous wave signal (color subcarrier signal) phase-synchronized with the first color subcarrier signal extracted from the analog video signal by the above first color subcarrier extracting circuit 2 in the form of digital data. Further, the continuous wave signal of the digital sine wave signal and the digital cosine wave signal formed by the oscillating circuit 5 is supplied to the digital signal converting circuit 6.

In the digital video signal converting circuit 6, the digital video signal supplied to the terminal 7 is converted into the analog composite video signal by these digital sine wave signal and digital cosine wave signal. Further, the analog composite video signal converted by the digital video signal converting circuit 6 is supplied to the mixing circuit 8, in which it is synthesized with or superimposed upon the analog video signal from the input terminal 1. Then, the synthesized or superimposed analog video signal is outputted to the output terminal 9.

Concurrently therewith, the analog composite video signal from the digital signal converting circuit 6 is supplied to the second color subcarrier extracting circuit 10, and the extracted second color subcarrier signal is supplied to the above phase error detecting circuit 3. Thus, when a phase difference occurs between the analog video signal from the above input terminal 1 and the analog composite video signal converted by the digital video signal converting circuit 6, the feedback control is carried out so as to eliminate the resultant phase difference.

Accordingly, also in the apparatus according to the third embodiment, the image expressed by the digital video signal supplied to the input terminal 7 and the image expressed by the analog video signal supplied to the input terminal 1 are synthesized with or superimposed upon each other directly, whereby the video signal in which these images are synthesized or superimposed can be outputted to the output terminal 9.

Further, in this apparatus, the second color subcarrier extracting circuit 10 extracts the second color subcarrier signal from the analog composite video signal by the digital video signal converting circuit 6 and this second color subcarrier signal is supplied to the above phase error detecting circuit 3. Therefore, even when a phase difference occurs between the analog video signal from the input terminal 1 and the analog composite video signal converted by the digital video signal converting circuit 6, the feedback control is carried out so as to eliminate this phase difference.

As described above, according to the above-mentioned apparatus, the continuous wave signal synchronized with the color subcarrier signal of the analog video signal is generated and the color signal component of the digital video signal is converted into the carrier chrominance signal by using the continuous wave signal, thereby forming the composite video signal containing the carrier chrominance signal synchronized with the phase of the color subcarrier signal of the analog video signal. Thus, the above-mentioned apparatus of simple arrangement can synthesize the image expressed by the digital video signal and the image expressed by the analog video signal.

Accordingly, by using the phase synchronizing method, circuit and synthesizing apparatus according to the present invention, the phase of the carrier chrominance signal of the analog video signal and that of the carrier chrominance signal contained in the composite video signal formed from the digital video signal can be synchronized by the simple arrangement, for example, whereby the image expressed by the digital video signal and the image expressed by the analog video signal can be synthesized with ease.

While the NTSC composite video signal, for example, is formed as described above, the present invention can be applied to a PAL composite video signal and composite video signals of other systems. Moreover, it is needless to say that the present invention is not limited to the two-axis modulation system but can be applied to a three-axis modulation system, for example. Furthermore, it is needless to say that the present invention can be modified variously without departing from the gist of the present invention largely.

We claim:

1. A video signal phase synchronizing circuit, comprising:
   signal generating means supplied with an analog video signal containing a first color subcarrier signal and generating a continuous wave signal synchronized with said first color subcarrier signal, said signal generating means comprising:
   a first color subcarrier extracting circuit adapted to extract said first color subcarrier signal from said analog video signal;
   a second color subcarrier extracting circuit for extracting a second color subcarrier signal from a composite video signal;
   a phase error detecting circuit for detecting a phase difference between said first color subcarrier signal obtained from said first color subcarrier extracting circuit and said second color subcarrier signal obtained from said second color subcarrier extracting circuit; and an oscillating circuit for generating a digital continuous wave signal based on an output of said phase error detecting circuit; and signal converting means for converting a digital video signal containing a color signal component into said composite video signal containing said second color subcarrier signal, wherein when said signal converting means converts said color signal component into a carrier chrominance signal of said composite video signal, said signal converting means uses said digital continuous wave signal and synchronizes said chase of said first color subcarrier signal and that of said second color subcarrier signal.

2. A video signal phase synchronizing circuit, comprising:

signal generating means supplied with an analog video signal containing a first color subcarrier signal and generating a continuous wave signal synchronized with said first color subcarrier signal, said signal generating means comprising:

a first color subcarrier extracting circuit for extracting said first color subcarrier signal from said analog video signal;

an oscillating circuit for generating said continuous wave signal whose phase is synchronized with that of said first color subcarrier signal obtained from said first color subcarrier extracting circuit; and an analog-to-digital converting circuit for converting said continuous wave signal into a digital continuous wave signal; and signal converting means for converting a digital video signal containing a color signal component into a composite video signal containing a second color subcarrier signal, wherein when said signal converting means converts said color signal component into a carrier chrominance signal of said composite video signal, said signal converting means uses said digital continuous wave signal and synchronizes said phase of said first color subcarrier signal and that of said second color subcarrier signal.

3. A video signal phase synchronizing circuit according to claim 2, further comprising a phase error detecting circuit for comparing phases of said first color subcarrier signal and said continuous wave signal and controlling a phase of said continuous wave signal generated from said oscillating circuit by a compared output.

4. A video signal synthesizing apparatus, comprising:

a first input terminal to which an analog video signal containing a first color subcarrier signal is supplied;

a signal generating means connected with said first input terminal and generating a continuous wave signal synchronized with said first color subcarrier signal, said signal generating means comprising:

a first color subcarrier extracting circuit for extracting said first color subcarrier signal from said analog video signal;

a second color subcarrier extracting circuit for extracting a second color subcarrier signal from a composite video signal;

a phase error detecting circuit for detecting a phase difference between said first color subcarrier signal obtained from said first color subcarrier extracting circuit and said second color subcarrier signal obtained from said second color subcarrier extracting circuit; and an oscillating circuit for generating a digital continuous wave signal based on an output from said phase error detecting circuit;

a second input terminal to which a digital video signal containing a color signal component is supplied;

signal converting means connected with said second input terminal and converting said digital video signal containing said color signal component into said composite video signal containing said second color subcarrier signal; and a mixing circuit for superimposing said analog video signal and said composite video signal, wherein when said signal converting means converts said color signal component into a carrier chrominance signal of said composite video signal, said signal converting means uses said digital continuous wave signal to synchronize the phase of said first color subcarrier signal and the phase of said second color subcarrier signal.

5. A video signal synthesizing apparatus, comprising:

a first input terminal to which an analog video signal containing a first color subcarrier signal is supplied;

a signal generating means connected with said first input terminal and generating a continuous wave signal synchronized with said first color subcarrier signal, said signal generating means comprising:

a first color subcarrier extracting circuit for extracting said first color subcarrier signal from said analog video signal;

an oscillating circuit for generating said continuous wave signal whose phase is synchronized with that of said first color subcarrier signal obtained from said first color subcarrier extracting circuit; and an analog-to-digital converting circuit for converting said continuous wave signal into a digital continuous wave signal;

a second input terminal to which a digital video signal containing a color signal component is supplied;

signal converting means connected with said second input terminal and converting a digital video signal containing said color signal component into a composite video signal containing a second color subcarrier signal; and a mixing circuit for superimposing said analog video signal and said composite video signal, wherein when said signal converting means converts said color signal component into a carrier chrominance signal of said composite video signal, said signal converting means uses said digital continuous wave signal to synchronize the phase of said first color subcarrier signal and the phase of said second color subcarrier signal.

6. A video signal synthesizing apparatus according to claim 5, further comprising a phase error detecting circuit for comparing phases of said first color subcarrier signal and said continuous wave signal and controls a phase of said continuous wave signal generated from said oscillating circuit.

* * * * *